US006869898B2

(12) United States Patent
Inaki et al.

(10) Patent No.: US 6,869,898 B2
(45) Date of Patent: Mar. 22, 2005

(54) QUARTZ GLASS JIG FOR PROCESSING APPARATUS USING PLASMA

(75) Inventors: Kyoichi Inaki, Tokorozawa (JP); Naoto Watanabe, Sakado (JP); Tohru Segawa, Koriyama (JP); Hiroyuki Kimura, Takefu (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 50 days.

(21) Appl. No.: 10/343,470
(22) PCT Filed: Jul. 30, 2001
(86) PCT No.: PCT/EP01/08804
§ 371 (c)(1),
(2), (4) Date: Jan. 30, 2003
(87) PCT Pub. No.: WO02/11166
PCT Pub. Date: Feb. 7, 2002

(65) Prior Publication Data
US 2003/0190483 A1 Oct. 9, 2003

(30) Foreign Application Priority Data
Jul. 31, 2000 (JP) ..................................... 2000-266245

(51) Int. Cl.[7] .............................................. H01L 21/00
(52) U.S. Cl. ........................................ 438/800; 65/17.3
(58) Field of Search .......................... 438/800; 65/17.3, 65/436; 428/141

(56) References Cited
U.S. PATENT DOCUMENTS 6,150,006 A * 11/2000 Hellmann et al. .......... 428/141
6,306,489 B1 * 10/2001 Hellmann et al. ......... 428/312.6
6,368,410 B1 * 4/2002 Gorczyca et al. ........... 118/715
6,425,168 B1 * 7/2002 Takaku ...................... 29/25.01
6,458,445 B1 * 10/2002 Inaki .......................... 428/141
6,548,131 B1 * 4/2003 Fabian et al. .............. 428/34.4

FOREIGN PATENT DOCUMENTS

| DE | 197 13 014 A | 10/1998 |
|---|---|---|
| DE | 197 19 133 A | 11/1998 |
| EP | 0 763 504 A | 3/1997 |
| JP | 08-106994 | 4/1996 |
| JP | 08-339895 | 12/1996 |

OTHER PUBLICATIONS

Patent Abstracts of Japan vol. 1996, No. 02, Feb. 29, 1996 & JP 07 277751 A (Shin Etsu Chem Co Ltd) Oct. 24, 1995 abstract.
Patent Abstracts of Japan vol. 018, No. 430(C–1236), Aug. 11, 1994 & JP 06 128762 A (Hitachi Chem Co Ltd) May 10, 1994 abstract.
Patent Abstracts of Japan vol. 1999, No. 09, Jul. 30,1999 & JP 11 106225 A (Shinetsu Quartz Prod Co Ltd) Apr. 20, 1999 abstract.

* cited by examiner

Primary Examiner—Matthew Smith
Assistant Examiner—Lex H. Malsawma
(74) Attorney, Agent, or Firm—Tiajoloff & Kelly

(57) ABSTRACT

An object of the present invention is to provide a quartz glass jig, which, when employed in a processing apparatus using plasma, is less in generation of abnormal etching and particles and low in contamination with impurities. This object is obtained by a quartz glass jig for a processing apparatus using plasma, wherein a surface of the jig is subjected to grinding or a sandblast processing and has a surface roughness $R_a$ in the range of from 2 $\mu$m to 0.05 $\mu$m, and microcracks of grinding marks formed during the grinding or sandblast processing have a depth of 50 $\mu$m or less.

8 Claims, 3 Drawing Sheets (a)

(b)

(c)

scale: 100 μm scale: 100 μm

US 6,869,898 B2

QUARTZ GLASS JIG FOR PROCESSING APPARATUS USING PLASMA

INDUSTRIAL FIELD OF APPLICATION

The present invention relates to a quartz glass jig used in a processing apparatus utilizing plasma, and more specifically, to a quartz glass jig, wherein a surface of the quartz glass jig is roughened by mechanical processing, and the depth of microcracks formed during the mechanical processing is shallow.

PRIOR ART

Recently, for the surface treatment of a semiconductor device such as a silicon wafer, etc., a treatment method utilizing plasma has bercome frequently used. As the above-described treatment method utilizing plasma, there are, for example, an etching method of introducing a halogen-based corrosive gas such as a fluorine-based gas, a chlorine-based gas, etc., in a plasma-generating chamber, while introducing a microwave via a microwave-introducing window, thereby forming a plasma from the above-described halogen-based corrosive gas internally present therein and treating a semiconductor device therewith; and a method of depositing silicon dioxide onto a surface of a semiconductor device. In these treatment methods utilizing plasma, as shown in Japanese Patent Laid-Open Nos. 106994/1996 and 339895/1996, etc., processing apparatus are used, and the processing apparatus are equipped with quartz glass-made jigs as window materials, rings for shielding, etc. As the material for the above-described quartz glass-made jigs, a natural quartz glass has hitherto been mainly used, wherein a surface thereof, which is brought into contact with plasma, is roughened by mechanical processing, thereby designing to stabilize the etching speed and to prevent attached materials from separation. For the mechanical processing, there have been used grinding processing using a whetstone such as diamond, etc., a sandblast processing method using a powder such as a silicon dioxide powder, a ceramics powder, etc., and processing of scraping away the quartz glass surface. But, the mechanical processing method involved a fault that simultaneously with roughening a quartz glass surface, microcracks are generated and attacked by radicals generated within the plasma, only the microcrack portion is etched and grown into an abnormal hole, and in the worst case, the quartz glass jig is cracked from that portion. Also, recently, it has been confirmed that in the plasma, abnormally intense ultraviolet rays and electron beams are released together with ions or radicals, which deteriorate the surface of the quartz glass jig, and the deteriorated portions become a source for generating particles, leading to a secondary adverse influence on a silicon wafer.

Furthermore, it sometimes happens that impurities enter the microcracks formed by the above-described mechanical processing, and the impurities are evaporated at the treatment of a silicon wafer to contaminate the silicon wafer.

PROBLEMS THAT THE INVENTION IS TO SOLVE

As a result of intensive investigations under these circumstances, the present inventors have found that when a surface of a quartz glass jig is subjected to mechanical processing such as grinding processing, sandblast processing, etc., so as to have a surface roughness $R_a$ of from 2 $\mu$m to 0.05 $\mu$m, while making a depth of microcracks of 50 $\mu$m or less, a quartz glass jig, which is free from the generation of abnormal etching and particles and is low in contamination of a silicon wafer with impurities, is obtained, and particularly, when the glass is a synthetic quartz glass, a more excellent jig is obtained. Furthermore, it has also been found that in the case where grinding marks formed during the above-described grinding processing are streaky grinding marks, by reducing the number of the grinding marks per length perpendicular to the grinding marks to 50 or less per millimeter, the contamination of the silicon wafer with impurities is more restrained, leading to the accomplishment of the invention.

An object of the invention is to provide a quartz glass jig, which, when used in a processing apparatus using plasma, is less in generation of abnormal etching and low in contamination with particles and impurities, and does not deteriorate the characteristics of a semiconductor device.

Also, another object of the invention is to provide a quarts glass jig made of a synthetic quartz glass, which is more excellent in the characteristics described above.

MEANS FOR SOLVING THE PROBLEMS

In order to attain the above-described objects, a invention is concerned with a quartz jig glass for a processing apparatus using plasma, wherein a surface of the jig is subjected to mechanical processing such that the quartz glass jig has a surface roughness $R_a$ in the range of from 2 $\mu$m to 0.05 $\mu$m, and microcracks formed during the mechanical processing have a depth of 50 $\mu$m or less. The mechanical processing can be a grinding or a sandblast processing alternatively. Microcracks of grinding marks formed during the grinding processing have a depth of 50 $\mu$m or less; and microcracks formed during the sandblast processing have a depth of 50 $\mu$m or less.

The quartz glass jig of the invention is a jig prepared from a natural or synthetic quartz glass, wherein its inner surface, which is brought into contact with plasma, is roughened such that a surface roughness $R_a$ is in the range of from 2 $\mu$m to 0.05 $\mu$m, for stabilizing the etching speed or preventing attached materials from separation. When the surface roughness $R_a$ exceeds 2 $\mu$m, radicals or ions generated within the plasma attack locally recesses on the roughened surface, whereby abnormal etching progresses. On the other hand, when the $R_a$ is less than 0.05 $\mu$m, secondary products (for example, particles, etc.) formed by the plasma are liable to be separated from the surface, so that the characteristics of the semiconductor device are possibly deteriorated.

The above-described roughened surface is formed by a method of scraping away the quartz glass surface by a mechanical processing method such as grinding processing using a whetstone such as diamond abrasive grains, sandblast processing using a powder such as a silicon dioxide powder, a ceramics powder, etc., but in this case, microcracks are formed on the surface. It is important that the depth of the microcracks formed is 50 $\mu$m or less. When the depth of the microcracks exceeds 50 $\mu$m, the particles of the quartz glass are liable to be separated from the quartz glass surface, and particles are more likely generated during the plasma treatment, thereby markedly hindering the electric characteristics of the semiconductor. In the grinding processing, grinding marks are formed, and particularly, in the grinding processing using a diamond whetstone, streaky grinding marks are formed. It is desired that the number of the grinding marks per length perpendicular to the grinding marks is 50 or less per millimeter. The grinding marks are measured through observation by a microscope as shown in FIG. 1. When the number of the grinding marks exceeds 50 per millimeter, many impurities enter the grinding marks and are released at the treatment of the semiconductor device, thereby markedly lowering the characteristics of the semiconductor device.

Also, for vanishing the streaky grinding marks as described above, there is a case of subjecting the surface to sandblast processing. In the sandblast processing, a powder such as green carbon, a silicon dioxide powder, a ceramics powder, etc., is used. In that case, it is necessary that not only the surface roughness $R_a$ of the jig surface is from 2 μm to 0.05 μm, but also the depth of the microcracks is 50 μm or less. When the depth of the microcracks of the quartz glass jig obtained by this processing method exceeds 50 μm, the progress of etching by radicals generated within the plasma becomes fast, and in the worst case, the jig is broken.

The depth of the microcracks described above is measured by an angle polishing process, and a schematic view of the principal portion of its apparatus is shown in FIG. 2. In FIG. 2, reference number 1 shows a cylinder, reference number 2 a piston, reference number 3 a polishing material and reference number 4 a specimen, respectively. In the cylinder 1 of the above-described polishing apparatus is inserted the piston 2 provided with a slope at the tip portion thereof, and the specimen 4 having a layer of mechanically processed microcracks is attached to the slope. Also, the above-described microcrack layer is subjected to angle polishing with the polishing material 3 at an angle in the range of θ=0.1 to 39°, and a polished length L at this time is measured, to obtain a depth D of the microcrack from the formula, $D = L \tan \theta \cong L \sin \theta$. When the angle θ of the angle polishing described above is less than 0.1°, an error becomes large. On the other hand, when the angle θ exceeds 30°, the shallow microcracks cannot be measured. Furthermore, the above-described L is measured by a microscope equipped with a stage micrometer, a microscopic photograph, etc. In the case of applying the angle polishing process, it is desired for facilitating the observation of microcracks to previously widen the microcracks with hydrofluoric acid, or to widen the microcracks with hydrofluoric acid after the angle polishing.

As a material for preparing the quartz glass jig of the invention, is desired a synthetic quartz glass, which has a low content of air bubbles and is excellent in homogeneity. The air bubbles become a precursor for abnormal holes to radicals or ions within the plasma, so that etching proceeds faster to form large holes. Also, when the homogeneity is low, the etching treatment is not uniformly carried out, and abnormal etching occurs.

MODE FOR CARRYING OUT THE INVENTION

Next, the invention will be explained in detail by the practical examples, but these examples are illustratively shown, and the invention is not limited thereto.

EXAMPLES

Example 1

A surface of a quartz glass was processed with a whetstone made of diamond having a particle size of 100 μm to obtain a quartz glass-made ring for shielding having a surface roughness $R_a$ of 1 μm. When the surface of this ring for shielding was observed by a microscope, 20 per millimeter of grinding marks were confirmed as shown in FIG. 1. Incidentally, FIG. 1 is a microscopic photograph of 100 magnifications of the surface of the ring for shielding described above, wherein (a) is an inner periphery side, (b) is a central portion, and (c) is an outer periphery side. With respect to a sample subjected to the same processing, after rinsing with 15% HF for 30 minutes, the sample was attached to a tip portion of a piston of a polishing apparatus shown in FIG. 2, the surface of the sample was inclined by 5° and polished to expose a microcrack layer 5 as shown in FIG. 3. A microscopic photograph at this time is shown in FIG. 4. In FIG. 4, at the right side a white portion is the portion subjected to angle polishing, and the left is a surface not subjected to angle polishing of the glass. In the portion subjected to angle polishing (transparent portion), whisker-like streaks are present, which are the microcracks widened with hydrofluoric acid. Such microcracks in the depth direction can be easily observed from the above. The length L of the whisker-like streaks was obtained from an interface between the transparent portion and a surface portion (the portion where the whiskers are gathered), and a depth (D) of the microcracks was calculated to be 20 μm. The above-described quartz glass-made ring for shielding was used in a plasma apparatus having an output of 1 kW and using $CF_4/O_2$ as a gas species. When the ring was used for one month, no problem occurred.

Comparative Example 1

A surface was processed with a whetstone of diamond having a particle size of 300 μm to obtain a quarts glass-made ring for shielding having a surface roughness $R_a$ of 3 μm. When the resulting surface was observed by a microscope, 200 per millimeter of grinding marks were confirmed. With respect to a quartz glass sample subjected to the same processing with a diamond whetstone, after rinsing with 15% HF for 30 minutes, the surface was inclined by 5° and polished. As a result of measuring the sample obtained for a depth of the microcracks by the angle polishing process as in Example 1, the depth was 100 μm. When the quartz glass jig was used as a ring for shielding of a plasma apparatus, after using for one week, abnormal etching portions occurred on the surface of the ring for shielding, whereby wafers could not be treated.

Example 2

The quartz glass-made ring for shielding, wherein 200 per millimeter of the streaky grinding marks were confirmed on the surface thereof in Comparative Example 1, was subjected to sandblast processing with green carbon of #240 and then subjected to sandblast processing with green carbon of #400. Although in Comparative Example 1, the surface roughness $R_a$ was 3 μm and the depth of the microcracks was 100 μm, after subjecting to sandblast processing with green carbon of #400, the streaky grinding marks were not observed even by a microscope. Also, the surface roughness $R_a$ was 1.7 μm, and the depth of the microcracks was 40 μm. When this quartz glass jig was used as a ring for shielding of a plasma apparatus, after using for 3 weeks, particles were generated a little, but such was lower than that in the internal specification so that no problem was created, and the jig could be used for one month.

ADVANTAGE OF THE INVENTION

The quartz glass jig of the invention is a jig, wherein the surface roughness $R_a$ is from 2 μm to 0.05 μm, and the depth of the microcracks formed during the mechanical processing is 50 μm or less. When it is used as a jig for a plasma processing apparatus, abnormal etching and particles are not generated, semiconductor devices are not contaminated with impurities, and high-quality semiconductor devices can be produced at a low cost.

DESCRIPTION OF THE REFERENCE NUMERALS AND SIGNS

Figure 1:
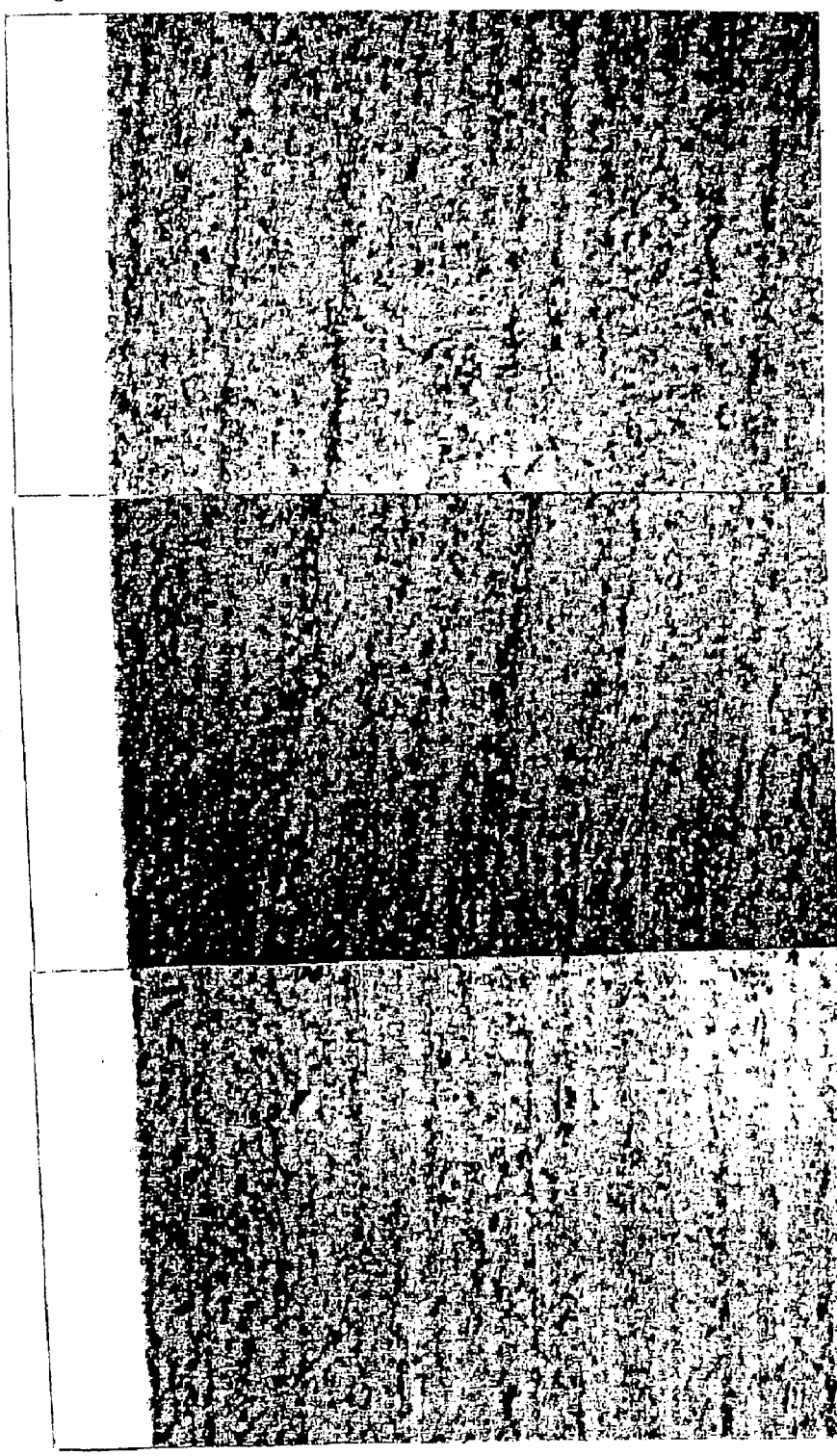
FIG. 1 A microscopic photograph of the surface of the quartz glass jig of Example 1, wherein (a) shows an inner periphery side of the jig, (b) shows a central portion of the jig, and (c) shows an outer periphery side of the jig.
Figure 1:
Figure 2:
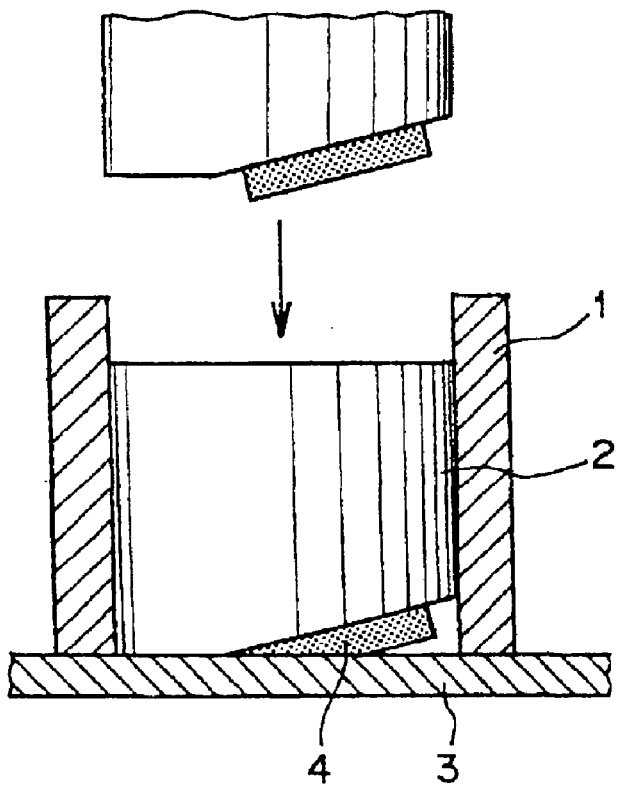
FIG. 2 A schematic diagram of the principal portion of the polishing apparatus for use in the angle polishing process.
Figure 3:
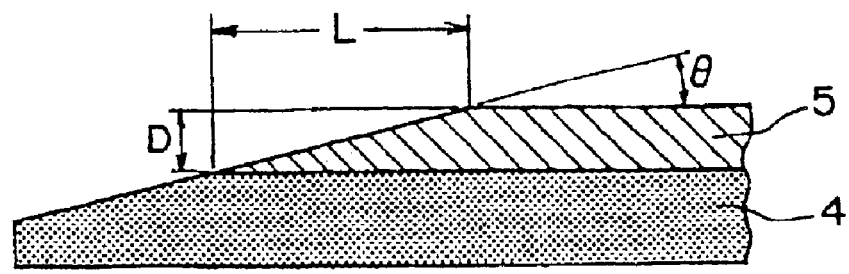
FIG. 3 An enlarged cross-section of a specimen polished with a polishing apparatus shown in FIG. 2.
Figure 4:
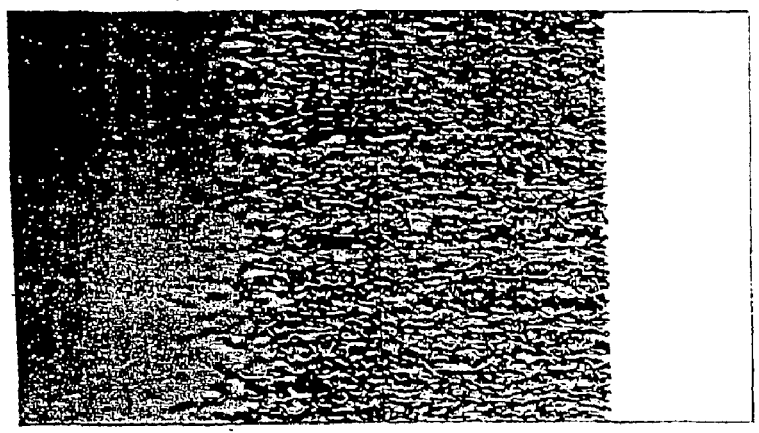
FIG. 4 A microscopic photograph showing a specimen with streaky microcracks after angle polishing treatment, wherein the white or grey portion is a portion not subjected to angle polishing, and the black streaky portion is a portion subjected to angle polishing.

1: Cylinder
2: Piston
3: Polishing material
4: Specimen
5: Microcrack layer
θ: Polishing angle
L: Polished length

What is claimed is:

1. A quartz glass jig for a processing apparatus using plasma, said jig comprising quartz glass having a surface of the jig, said surface having been subjected to mechanical processing such that the quartz glass of the jig has a surface roughness $R_a$ in the range of from 0.05 μm to 2 μm, and microcracks formed during the mechanical processing have a depth of 50 μm or less, and wherein the microcracks formed during mechanical processing are streaky grinding marks formed during grinding processing, and said streaky grinding marks are present in a number per a length perpendicular to said streaky grinding marks that is 50 streaky grinding marks or fewer per millimeter of said perpendicular length.

2. The quartz glass jig as claimed in claim 1, wherein the mechanical processing is a grinding or a sandblast processing.

3. The quartz glass jig as claimed in claim 2, wherein the quartz glass is a synthetic quartz glass.

4. The quartz glass jig as claimed in claim 1, wherein the quartz glass is a synthetic quartz glass.

5. A process for plasma treatment, said process comprising:

providing a quartz glass jig having a quartz glass surface that has been subjected to mechanical processing such that the quartz glass surface of the jig has a surface roughness $R_a$ in the range of from 0.05 μm to 2 μm, and microcracks formed during the mechanical processing have a depth of 50 μm or less, wherein the microcracks formed during mechanical processing are streaky grinding marks formed during grinding processing, and said streaky grinding marks are present in a number per a length perpendicular to said streaky grinding marks that is 50 streaky grinding marks or fewer per millimeter of said perpendicular length; and introducing plasma in contact with the quartz glass surface of the jig.

6. A process according to claim 5, wherein the mechanical processing is a grinding or a sandblast processing.

7. A process according to claim 6, wherein the quartz glass is a synthetic quartz glass.

8. A process according to claim 5, wherein the quartz glass is a synthetic quartz glass.

* * * * *